Dec. 12, 1967 R. T. SMITH ET AL 3,358,124

DATA CARD TRANSLATING DEVICE

Filed July 26, 1963 3 Sheets-Sheet 1

INVENTORS
Raymond T. Smith
Curtis L. Parish

BY Eshastings Ackley and Walter J. Jagmin

ATTORNEYS

INVENTORS
Raymond T. Smith
Curtis L. Parish
BY Hastings Ackley and Walter J. Jagmin
ATTORNEYS INVENTORS
Raymond T. Smith
Curtis L. Parish
BY Eastings Adelap and Walter J. Jaeger
ATTORNEYS

United States Patent Office 3,358,124

Patented Dec. 12, 1967

3,358,124

DATA CARD TRANSLATING DEVICE

Raymond T. Smith, Dallas, and Curtis L. Parish, Grand Prairie, Tex., assignors to Datamatics International, Inc., Arlington, Tex., a corporation of Texas Filed July 26, 1963, Ser. No. 297,821

11 Claims. (Cl. 235—61.11)

ABSTRACT OF THE DISCLOSURE

A system is described using a storage data device for storing information in accordance with a coded pattern, and a translating or readout device for translating the coded information into electric signals. These electric signals, in turn can be used to control utilization devices such as gasoline dispensing pumps, various tape-operated tools, etc.

This invention relates to control systems and more particularly to a data storage device and to a translating or decoder device for translating the data stored in the storage device to electric signals.

Many automated apparatuses, such as recorders, machine tools, vending machines, and the like, have motive means for operating such devices controlled by suitable computers or data handling devices. It is desirable that the operation of such devices be controlled by data stored in cards, keys and the like, when the latter are inserted in a suitable translating device, decoder or reader which translates the information stored in such cards or keys into electric signals which are then transmitted to the computer or data handling devices of such machines.

It is desirable that such data storage devices be very compact while at the same time be capable of storing a great amount of data, that the data be stored in such manner on the data storage device that the storage device carrying particular information cannot be easily duplicated, thus preventing unauthorized operation of such machine, and that the translating device be of simple construction and operation and have no moving parts engageable with the storage device in order that the data be quickly translated into electric signals and in order to prevent wear of the storage device.

Accordingly, an object of this invention is to provide a new and improved control system for controlling the operation of such apparatuses as vending machines for vending gasoline and the like, computer controlled machine tools, recording devices, time clocks, identification devices and the like, which includes a data storage device preferably in the form of a small flat card and a data translating device for translating the data stored on the card into electric signals to control the operation of such apparatuses.

Another object is to provide a data storage device wherein the card in which the information is stored is opaque and has no visible indication of the data stored therein.

Another object is to provide a control system wherein the data from the storage device or card is translated into binary and ternary codes so that the control system may be employed with data handling devices of machines employing either binary or ternary codes.

A further object is to provide a data translating device having a plurality of inductive devices, the reluctance of whose flux paths is varied by the data storage device in accordance with the data stored therein whereby the outputs of the plurality of the inductive devices vary in accordance with the data stored in the card.

A still further object is to provide a new and improved translating device including a plurality of transformers, the outputs of whose secondary windings, when a signal is applied to their primary windings vary in amplitude and polarity in accordance with the reluctance of the flux paths of the windings.

A further object is to provide a control system having means for sequentially energizing the primary windings of the transformers of the data translating device with electric signals.

Another object of the invention is to provide a data translating device including a transformer having a pair of flux paths in which magnetic fluxes are induced when a voltage pulse is applied across a winding thereof and the output of another winding thereof varies in accordance with the difference in the reluctances of the two flux paths.

Another object is to provide a card having magnetic means for varying the reluctance of the flux paths of the transformer in a predetermined manner in accordance with the data stored in the card whereby when a pulse is applied to a winding of the transformer another winding thereof may have no voltage induced therein or have a voltage pulse of either polarity induced therein.

Still another object is to provide a data storage device comprising a card having magnetic means for varying the reluctance of the flux paths of a transformer when the card is placed in operative relationship with the transformer.

Still another object of the invention is to provide a card having discontinuities in its reluctance at predetermined locations of the card in accordance with the data stored thereon.

Additional objects and advantages of the invention will be readily apparent from the reading of the following description of a device constructed in accordance with the invention, and reference to the accompanying drawings thereof, wherein.

Figures 1, 2, 3, 4:
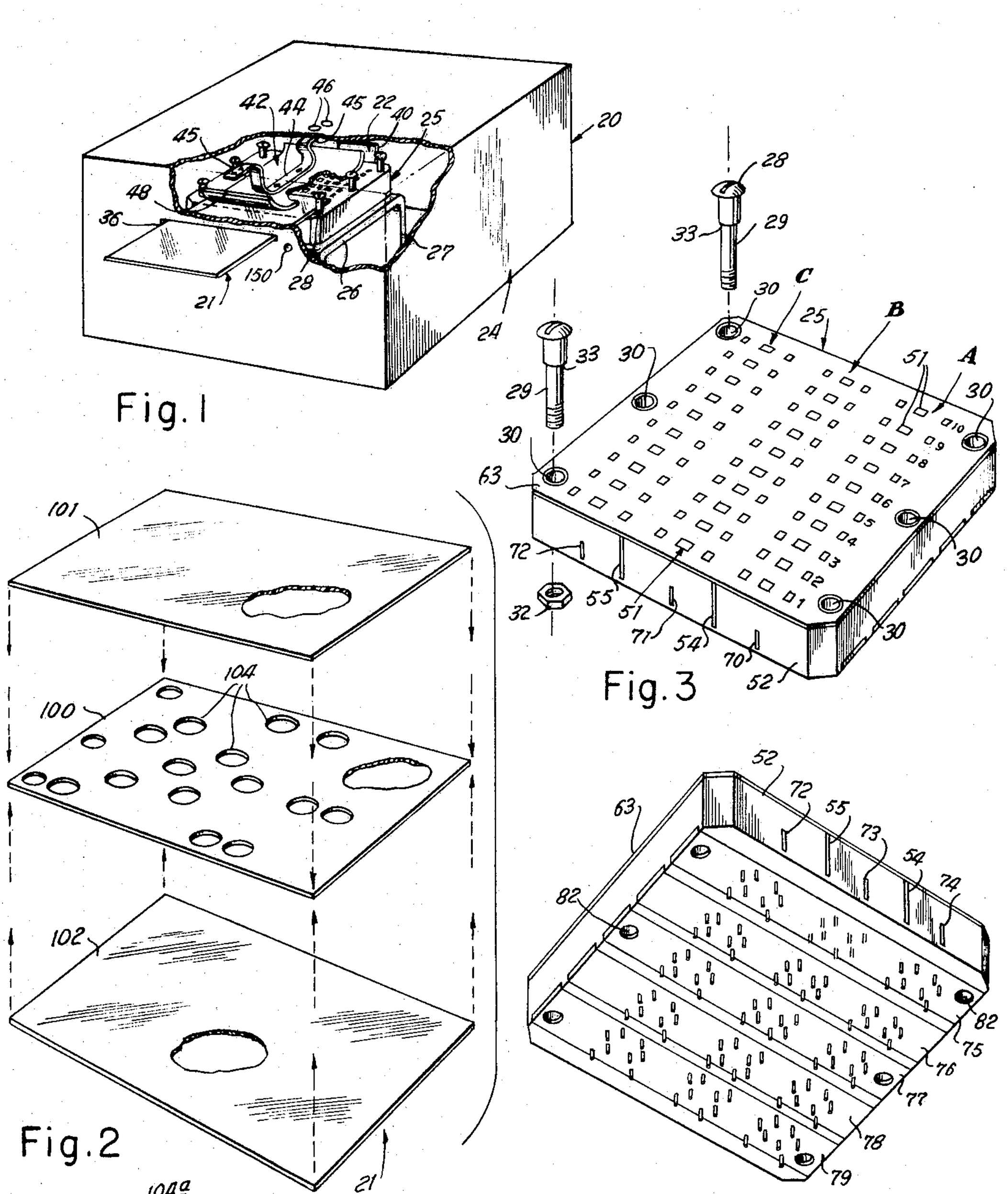
FIGURE 1 is a perspective view, with some parts broken away, of the control system embodying the invention showing the data storage device or card partially inserted in the data translating device.
FIGURE 2 is a perspective exploded view of the card.
FIGURE 3 is a perspective exploded view showing the top side of a transformer block of the translating device and two of the mounting studs thereof.
FIGURE 4 is a perspective view showing the bottom side of the transformer block.

Referring now to the drawings, the control system 20 embodying the invention includes a data storage device or card 21 and a data translating device 22 for detecting or reading the information data stored in the card 21 and translating it into electric signals. The data translating device may be secured in a cabinet or housing 24. The translating device 22 includes a transformer block 25 which is rigidly secured to the horizontal plate 26 of a housing bracket 27 by any suitable means as by the guide studs 28 whose reduced lower portions 29 extend through the sleeves 30 of the transformer block and through suitable aligned apertures in the plate 26 of the mounting bracket and are rigidly secured thereto by means of the nuts 32 threaded on the lower ends of the studs. The upper portion of each guide stud is enlarged to provide a downwardly facing shoulder 33 which is engageable with the upper surface of the transformer block.

The card 21 when inserted through a slot 36 is in predetermined position on the top surface of the transformer block being held against lateral movement by the guide studs on each side and its inward movement being stopped by a suitable upwardly extending stop block 40 of the mounting bracket. The card is held against the top surface of the transformer block by a suitable presser plate 44 resiliently biased downwardly by the leaf spring 44 whose intermediate portion is secured to the presser plate, as by spot welding, and whose upper oppositely extending tab or end portions 45 may abut the bottom surface of the top wall of the housing and are rigidly secured thereto, as by rivets 46. The presser plate has an upwardly curved forward end portion 48 to facilitate movement therepast of the forward or leading edge of the card 21 as it is inserted through the slot of the housing and between the presser plate and the top surface of the transformer block.

The transformer block 25 includes a plurality of transformers 51 embedded in a body 52 of a suitable potting compound or substance which rigidly holds the transformers 51 in predetermined positions relative to each other. For example, the transformers may be arranged in three longitudinal columns, A, B and C, and in ten transverse rows, 1, 2, 3 . . . 10, three transversely aligned transformers of the three columns comprising each row. Adjacent columns of the transformers have magnetic shield bars 54 and 55 of a magnetic material interposed therebetween to prevent inductive coupling of the windings of transformers of adjacent columns.

Each of the transformers includes an E-shaped core 57, formed of suitable E-shaped laminations 58 and has outer legs 59 and 60 and a middle leg 61 extending from the base 62. The outer end portions of the legs of the transformers extend through suitable apertures in a top plate 63 of the transformer block and their upper end surfaces are flush with the top surface of the top plate. The top plate is formed of a suitable insulating substance, such as phenolic or the like. The sleeves 30 of course also extend through suitable apertures in the top plate.

The longitudinally extending spacer bars 70, 71 and 72 have their upper edges abutting the bottom surface of the horizontal base of the cores of the transformers in the three columns A, B and C, respectively, and their upper edges abut the transversely extending terminal strips 75, 76, 77, 78 and 79 embedded in the body 52. The lower surfaces of the terminal strips are parallel with and substantially flush with the bottom surface of the body. The terminal strips 75, 77 and 79 have apertures 82 aligned with the central bores or passages of the sleeves 30 so that the mounting studs may extend downwardly therethrough.

Each of the terminal strips has a plurality of terminals 84 rigidly mounted thereon to which are connected the lead wires 85 of the primary and secondary windings of two rows of transformers. For example, the lead wires of the primary and secondary windings of the transformers of the rows 1 and 2 are connected to the terminals of the strip 75, lead wires or conductors of the windings of the transformers of rows 3 and 4 are connected to the terminals of the terminal strip 76, and so on. The terminals protrude downwardly through a suitable aperture or apertures in the plate 26 so that conductors or wires connected to the outer ends of the terminals may connect each winding in a suitable circuit as will be described below.

Figure 5:
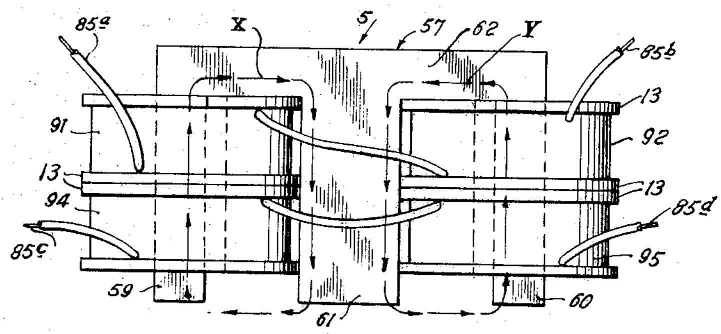
FIGURE 5 is an enlarged side view of one of the transformers of the transformer block and showing the flux paths thereof when a voltage of a predetermined polarity is applied across the primary winding thereof.

Each transformer 50 includes a pair of primary windings 91 and 92 having equal numbers of turns disposed on the outer legs 59 and 60, respectively, of its transformer core 57 connected in series with one another by the conductor 93 and which when energized by a pulse of electric current induce the magnetic flux having the direction indicated by the arrows in the two magnetic flux paths X and Y of the core, as indicated in FIGURE 5. the flux path X, energized by current in the primary winding 91, extends through the outer and middle legs 59 and 61, the base 62 of the core between the outer legs 59 and the middle leg and the air gap between the free ends of the outer leg 59 and the middle leg. The flux path Y, energized by current in the primary winding 92, extends through the outer leg 60 and the middle leg, the portion of the core base between the outer leg 60 and the middle leg, and the air gap between the free ends of the middle leg and the outer leg 60. The primary windings 91 and 92 are connected in such manner that the flux induced by the current in each of the primary windings travels in the same direction in the portions of the flux paths X and Y extending through the middle leg 61 as illustrated in FIGURES 5 and 6.

Each transformer also has a pair of secondary windings 94 and 95 having equal numbers of turns disposed about the outer legs 59 and 60, respectively, of its core 57 which are connected in series by the conductor 96 in such manner that the magnetic flux flowing in the path X induces a voltage in the secondary winding 94 of opposite polarity to the voltage induced in the secondary winding 95 by the magnetic flux in the path Y. It will therefore be seen that if the reluctances of the two flux paths X and Y are equal and a voltage pulse is applied across the lead wires 85*a* and 85*b* of the primary windings 91 and 92, the voltages induced in the secondary windings 94 and 95 are equal and of opposite polarity so that no voltage pulse appears across the lead wires 85*c* and 85*d* of the secondary transformers.

The data storage device or card 21 when placed in operative position on the top surface of the transformer block 25 extends across the outer ends of the legs of the transformer cores. The card includes a very thin plate or sheet 100 of magnetic material sandwiched between and bonded to the two sheets 101 and 102 of a suitable nonmagnetic substance, such as a suitable plastic. The plastic sheets 101 and 102 are preferably opaque so that the location of the varous apertures in the magnetic plate 100 are not visible, thus making very difficult unauthorized duplication of the card.

Figure 6:
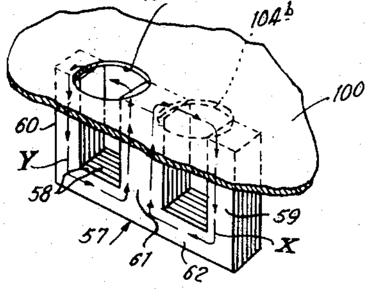
FIGURE 6 is a fragmentary perspective view of the core of the transformer illustrated in FIGURE 5 and a portion of the card showing the manner in which the reluctance of the two flux paths of the core is varied by the card.

Referring now particularly to FIGURE 6, the magnetic plate 100 is shown disposed on the upper ends of the legs of a core 57 of one of the transformers 51 with an aperture 104*a* located between the upper ends of the outer leg 60 and the middle leg 61. It will be apparent that the reluctance of the flux path X will be less than the reluctance of the flux path Y since the reluctance of the flux path X, which now includes a portion of the plate between the ends of the legs 59 and 61 instead of an air gap, is much smaller than the reluctance of the flux path Y since the flux path Y still includes an air gap directly between the upper ends of the outer leg 60 and the middle leg 61 due to the presence of the aperture 104*a* in the plate 100 between these two legs. It will thus be apparent that the voltage induced in the secondary winding 94 will be appreciably greater than the voltage induced in the secondary winding 95 when a voltage pulse is applied across the terminal wires 85*a* and 85*b* of the primary windings and a voltage pulse of one polarity appears across the lead wires 85*c* and 85*d* of the secondary windings 94 and 95. Conversely, if an aperture 104*b* in the magnetic plate 100, as indicated in broken lines in FIGURE 6, is located between the outer leg 59 and the middle leg 61 of the core and no such aperture in the plate is located between the upper ends of the outer leg 60 and the middle leg 61, a voltage pulse of the opposite polarity will appear across the terminal wires 85*c* and 85*d* of the primary windings when a voltage pulse is applied across the lead wires 85*a* and 85*b* of the primary windings since the reluctance of the flux path X will now be greater than the reluctance of the flux path Y. If the magnetic sheet has no apertures located between the outer leg and the middle leg of a particular transformer, the voltage induced in one secondary winding is then equal to the voltage induced in the other secondary winding since the reluctances of the two flux paths are equal. Since the voltages induced in the two primary windings 94 and 95 are equal and of opposite polarity, no voltage will appear across the terminal wires 85*c* and 85*d* when a voltage pulse is applied across the two primary windings. It will be apparent of course that if desired two apertures 104 may be located between the two outer legs and the middle leg of the core of a particular transformer in which case the reluctance of the two flux paths is again equal and again no voltage will appear across the lead wires of the two secondary windings when a voltage impulse is applied across the two primary windings.

It will thus be apparent that when the card data storage device 21 is inserted into the cabinet through the slot 36 thereof and placed above and in engagement with the top surface of the transformer assembly block 25, the data stored on the plate 100 in the form of the apertures 104 and their preselected locations relative to selected outer and inner legs of the several different transformers will, when a voltage pulse is applied to the primary windings of the various transformers either simultaneously or sequentially, be translated into voltage pulse outputs of the various secondary windings of one polarity or the other or no output so that in effect a ternary code or system is provided by the control system.

It will be apparent that the primary windings may be so connected that the magnetic fluxes in the two flux paths X and Y flow in opposite directions in the middle leg when the voltage pulse is applied across the terminal wires 85*a* and 85*b* of the primary windings 91 and 92 in which case the direction of the coils of one of the secondary windings on its outer leg 59 or 60 has to be reversed so that as long as the two flux paths are of equal reluctance no voltage output will appear across the terminal wires 85*c* and 85*d* of the secondary windings.

Each transformer winding is shown wound on a separate bobbin B for ease of manufacture, assembly and repair although it will be apparent to those skilled in the art that the primary and secondary windings mounted on the outer leg may be wound on the same bobbin, if desired.

Figure 7:
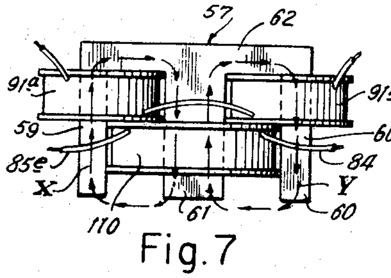
FIGURE 7 is a side view showing another form of transformer usable in the translating device and having a single secondary winding.

Referring now to FIGURE 7, a modified form of the transformer usable in the translating device is illustrated and includes a pair of primary windings 91*a* and 91*b* connected in series and disposed on the outer legs 59 and 60 of the core in such manner that the flux in the flux path X in the middle leg 61 flows in the opposite direction from the flux in the flux path Y. Since the two primary windings have equal numbers of turns, as long as the reluctance of the two flux paths is equal, the oppositely flowing magnetic fluxes induced by the current in the two primary windings are equal and opposite and no voltage is induced in the single secondary winding 110 disposed about the middle leg 61 of the transformer core. If the reluctance of one flux path, for example, the flux path X, is now increased, as when the magnetic sheet 100 is disposed across the ends of its legs with an aperture 104 thereof extending between and across the ends of the outer leg 59 and the middle leg, a voltage pulse of one polarity will now appear across the terminal wires 85*e* and 85*f* of the primary winding since a greater amount of magnetic flux will now flow through the flux path Y than through the flux path X. Conversely, if the card is positioned across the legs of the core and the aperture 104 is disposed between the outer leg 60 and the middle leg of the transformer, thus increasing the reluctance of the flux path Y, greater amount of magnetic flux will flow through the flux path X than through the flux path Y and a voltage pulse of opposite polarity will then appear across the terminal wires 85*e* and 85*f* of the secondary windings. If no such aperture of the card or plate 100 is located between either outer leg and the middle leg or if such apertures are located between each of the outer legs and the middle leg, no pulse will be induced in secondary winding when the voltage pulse is applied across the terminal wires of the primary winding since the fluxes in the two flux paths in the middle leg now induced by the voltages in the two primary windings are equal and are flowing in opposite directions therethrough.

Figure 8:
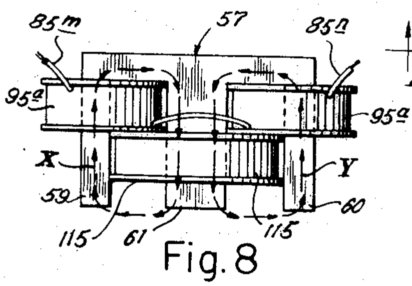
FIGURE 8 is a side view of another form of transformer usable in the translating device having a single primary winding.
Figure 9:
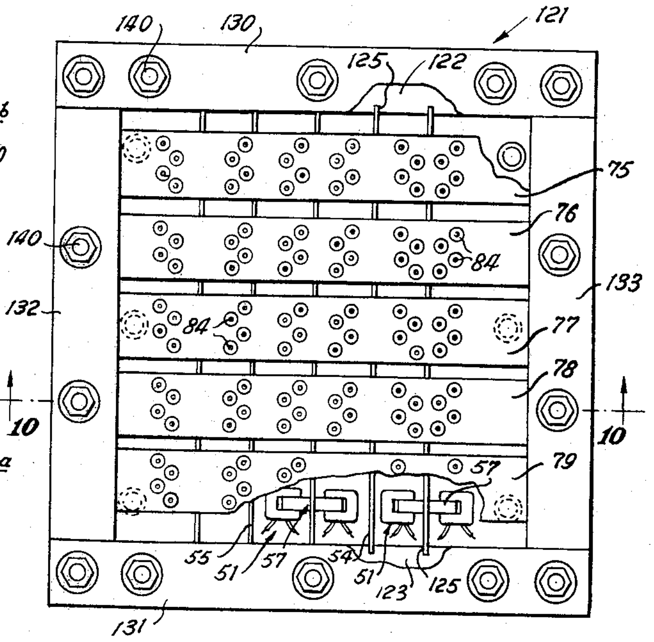
FIGURE 9 is a top plan view with some parts broken away of a mold in which the transformer block assembly is formed.

Referring particularly to FIGURE 8, another modified form of the transformer which may be employed in the data translating device has a single primary winding 115 disposed on the middle leg 61 of the transformer core and a pair of secondary windings 94*a* and 95*a* disposed on the outer legs 59 and 60. The secondary windings are connected in series and so disposed on the outer legs that when the reluctance of the two flux paths X and Y is equal, equal voltages of opposite polarities are induced in the two secondary windings so that no voltage appears across the terminal wires 85*m* and 85*n*. When the reluctance of one path, for example the path X, is increased, the voltage induced in the secondary winding 95*a* is greater than the voltage induced in the other secondary winding 95*a* so that a voltage pulse of one polarity appears across the terminal wires 85*m* and 85*n* and when the reluctance of the flux path Y is greater than the reluctance of the flux path X, a greater voltage pulse is induced in the secondary winding 94*a* than in the secondary winding 95*a* so that a voltage pulse of the opposite polarity appears across the terminal wires 85*m* and 85*n*.

It will thus be apparent that each transformer may have either one or two secondary windings and either one or two primary windings as long as each transformer provides a pair of flux paths in which magnetic flux is induced by a voltage pulse applied across the primary winding or windings which flux flows in the two flux paths in such relation to the secondary winding or windings that no voltage appears across the lead wires of the secondary winding or windings when the reluctance of the two flux paths is equal and that a pulse of one polarity appears across the lead wires of the secondary winding or windings when the reluctance of one flux path is greater than the reluctance of the second flux path and that the voltage pulse of the opposite polarity appears across the lead wires when the reluctance of the second flux path is greater than the reluctance of the first flux path of the transformer.

In the fabrication of the transformer block 25, the terminal wires of the coils of the windings of each transformer are connected to appropriate terminals 84 of its associated terminal strip, the windings are then placed on the appropriate outer legs of the cores, the outer end portions of the legs of each transformer are inserted into the appropriate apertures in the top plate, the sleeves 30 inserted in their suitable apertures in the top plate and the assembly of the top plate, the transformers and sleeves are then placed on the flat base 120 of a mold 121. The spacer bars 70, 71 and 72 are inserted between the terminal strips and the base portions 62 of the transformers, and the shield bars 54 and 55 are inserted between the top plate and the terminal strips between adjacent columns of transformers. The end walls 122 and 123 of the mold are then positioned on the extreme outer end portions of the top plate 63 and the opposite end portions of the spacer and shield bars are received in aligned vertical grooves 125 of the two end walls. The two side walls 128 and 129 of the mold are then positioned between the outer end portions of the end mold walls and on top of the outer side portions of the top plate. The extreme end portions of the terminal strips are then supported on the inner portions of the top surfaces of the side walls. The end and side retainer bars 130, 131, 132, and 133, are then positioned on the end and side walls of the mold. The end retainer bars hold the spacer and shield bars against upward displacement in the mold and the side retainer bars, which have inner recesses 134 provided in which the outer end portions of the terminal strips are received, hold the terminal strips in proper transverse alignment on the spacer strips and isolating bars. The mold walls and retainer bars are then rigidly secured to one another and to the base plate by means of the bolts 140 which extend through aligned apertures thereof. A suitable potting compound or substance is then poured into the mold to fill the space between the top plate and the terminal strips and between the transformers and the spacer and shield bars.

After the potting compound or substance has set or cured the mold is disassembled to free the block from the mold and the protruding end portions of the terminal strips, the top plate and the spacer and shield bars are cut off or ground off to the outer surfaces of the block formed by such potting substance. The apertures 82 in the terminal strips are then formed by a drill which is also run through the sleeves 30 to remove any potting compound which may have leaked thereinto. The transformers of the transformer block are thus held rigidly in predetermined relationship to each other by the potting substance.

Figure 10:
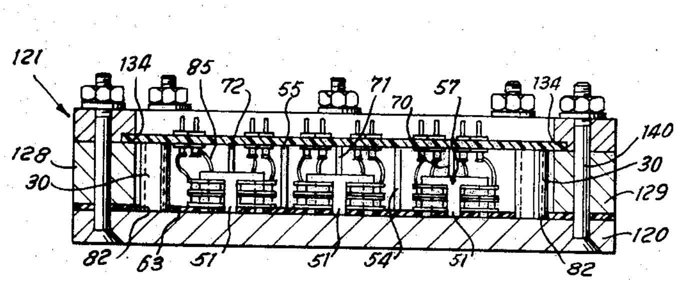
FIGURE 10 is a sectional view taken on line 10—10 of FIGURE 9.
Figures 11, 11A:
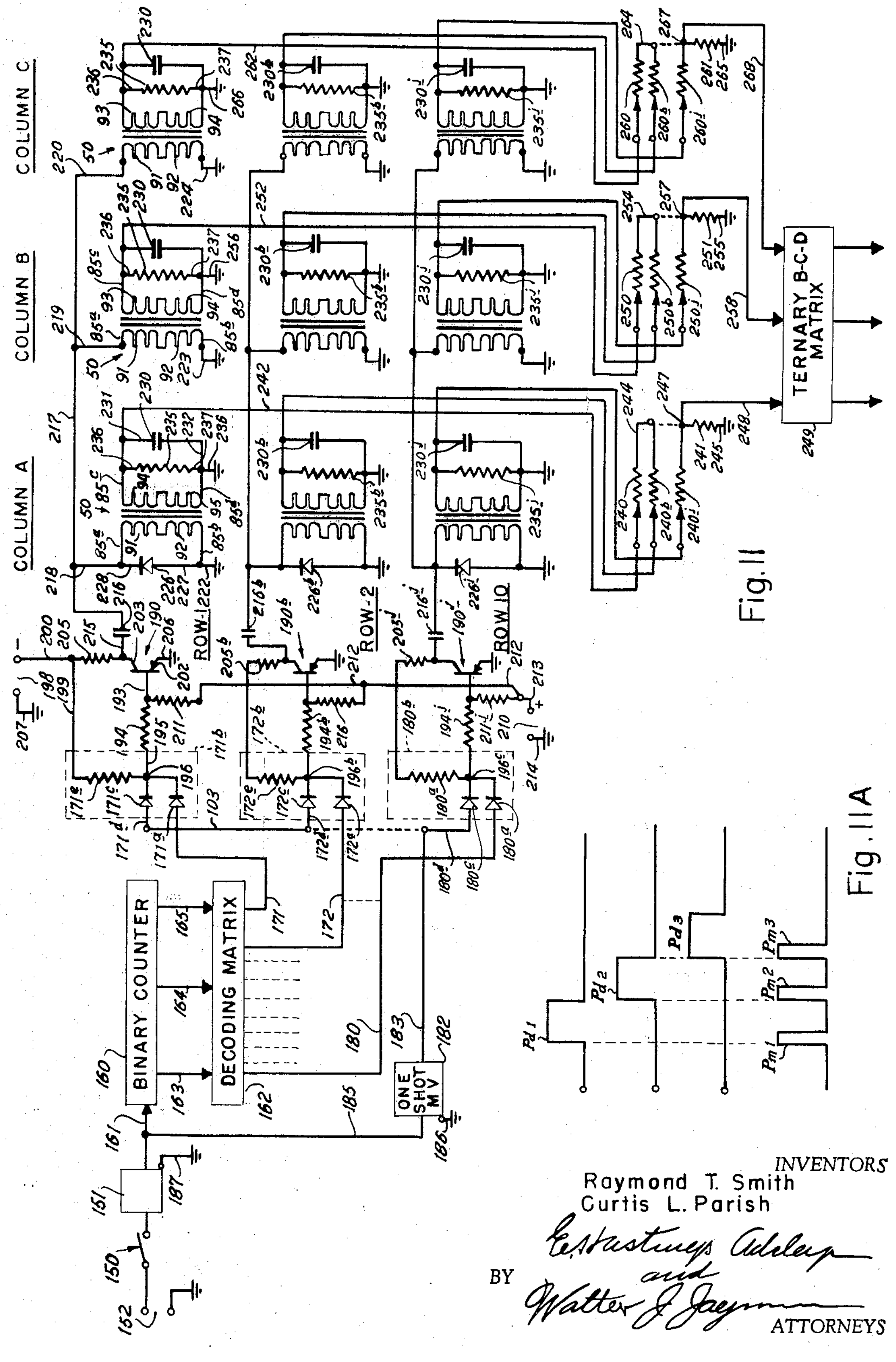
FIGURE 11 is a schematic illustration of the circuit of the data translating device.
FIGURE 11A shows the time relationship of the interrogator pulses transmitted sequentially and in predetermined sequence to the primary windings of the transformers of the translating device.

The circuit illustrated in FIGURE 10 is employed to energize sequentially the ten rows of transformers of the transformer block 25 with voltage pulses to induce output voltage pulses in the secondary windings of certain transformers selected or determined by the location of the apertures 104 in the plate 100 of the card. The polarities of the output voltage pulses of the selected transformers are also determined by the location of the plate apertures. The circuit includes a switch 150 which may be mounted on the front wall of the cabinet which when actuated connects a clock or suitable pulse generating device 151, which produces pulses of predetermined equal widths or periods at predetermined equal intervals of time, across an input circuit 152. The output of the clock 151 is transmitted to a conventional binary counter 160 by means of a suitable conductor 161. The output of the binary counter is transmitted to a conventional decoding matrix 162 by the conductors 163, 164 and 165. The decoding matrix produces output voltage pulses which are applied sequentially to the output conductors 171, 172 . . . 180 over which sequentially are transmitted the interrogating voltage pulses from the decoding matrix 162 to the semi-conductors 171*a*, 172*a* . . . 180*a* of any suitable AND gates 171*b*, 172*b* . . . 180*b*. The number of output conductors of the decoding matrix and of AND gates corresponds to the number of rows of transformers of the transformer block. The AND gates also include the diodes 171*c*, 172*c* . . . 180*c* connected to a one-shot multivibrator 182 by the conductor 183 and the conductors 171*d*, 172*d* . . . 180*d*, respectively. The multivibrator is connected to the output circuit of the clock 151 by the conductors 185 and 186, ground and the conductor 187 and produces an output pulse each time the clock 151 produces a pulse so that the diodes 171*d*, 172*d* . . . 180*d* of the AND gate are simultaneously energized by pulses P*m* each time the clock produces a voltage pulse.

The diodes 171*a*, 172*a* . . . 180*a* of the AND gates are energized sequentially by the pulses P*d*1, P*d*2 . . . P*d*10, from the decoding matrix and, since the multivibrator output pulses are synchronized with the decoding matrix output pulses, both diodes of an AND gate are simultaneously energized whenever the decoding matrix transmits a pulse to the diode 171*a*, 172*a* . . . or 180*a* of such AND gate to cause such AND gate to transmit a voltage pulse across the primary windings of a particular row of transformers of the transformer block 25.

The AND gate 171 controls the driver transistor 190 which in turn controls flow of current through the primary windings of the three transformers of Row 1. The base 192 of the driver transistor is connected by the conductor 193, the resistance 194 and the conductor 195 to the common connection 196 of the resistance 171*e* and the diodes 171*a* and 171*c* of the AND gate 171*b*. The resistance 171*e* is connected to one side of the source or input circuit of negative voltage 198 by the conductors 199 and 200. The emitter 202-collector 203 circuit of the driver transistor is connected across the source of negative voltage 198 by the conductor 200, the resistance 205, the conductor 206, ground and the conductor 207. The base emitter circuit of the driver transistor is connected across a source 210 of positive bias voltage by means of the conductor 193, the resistance 211, the conductor 212, the conductor 213, ground and the conductors 214 and 206.

The output of the driver transistor is applied across the primary windings 91 and 92 of the three transformers 50 of Row 1 of the transformer block 25 by means of the conductor 215, the blocking capacitor 216, the conductor 217, the conductors 218, 219 and 220 which are connected to the lead wires 85*a* of the transformers of Columns A, B and C, respectively, and in Row 1. The lead wires 85*b* of the primary windings of the transformers of Columns A, B and C, respectively, and in Row 1 are connected to ground by the conductors 222, 223 and 224, respectively.

In order to prevent back swing or generation of a pulse of reverse polarity in the transformer windings upon the termination of the initial pulse, a diode 226 is connected across the primary windings of the transformers of Row 1, one side of the diode being connected to the lead wires 85*b* of the three transformers by the conductor 227 and ground and its other side being connected to the lead wires 85*a* of the primary windings of the transformers in Row 1 and Columns A, B and C by the conductor 228, the conductor 217 and the conductors 218, 219 and 220, respectively.

A shunt capacitor 230 for reducing the capacitive coupling between the primary and secondary windings of each transformer is connected across the secondary windings of each transformer, one side of said shunt capacitor being connected to the lead wire 85*c* of the secondary windings of its transformer by the conductor 231 and its other side being connected to the lead wire 85*d* of the secondary windings by the conductor 232.

A resistance 235 is also connected to each pair of secondary windings of each transformer to reduce ringing by means of the conductors 236 and 237 which are connected to the lead wires 85*c* and 85*d* of each pair of secondary windings of each transformer.

The output of the secondary winding of the transformer of Column A and Row 1 of the transformer block 25 is applied across the serially connected resistances 240 and 241 by means of the conductor 242, the conductors 244 and 245, ground and the conductor 246. The common connection 247 of the resistances 240 and 241 is connected by the conductor 248 to a ternary-to-binary code decimal matrix 249.

The output of the secondary windings of the transformer of Column B and Row 1 is similarly applied across the serially connected resistances 250 and 251 by means of the conductors 252, 254 and 255, ground and the conductor 256. The common connection 257 of the resistances 250 and 251 is connected to the second input conductor 258 of the matrix 249.

The output of the secondary windings of the transformer of Column C and Row 1 is applied across the serially connected resistances 260 and 261 by means of the conductors 262, 264 and 265, ground and the conductor 266. The common connection 267 of the resistances 260 and 261 is connected to the third input conductor 268 of the matrix 249.

It will thus be apparent that when the pulse P*d*1 from the decoding matrix 162 and the pulse P*m*1 from the multivibrator are simultaneously applied to the diodes 171*a* and 171*c* of the AND gate 171*b*, a control pulse is applied across the base emitter or input circuit of the driver transistor and the pulse output of the driver transistor 190 is simultaneously applied across the primary windings of the three transformers of Column A and Row 1 and, if the reluctances of the two flux paths of these transformers are unequal, the voltage pulses thus induced across the lead wires 85*c* and 85*d* are transmitted to the input conductor 248, 258 and 268 of the matrix 249. Each pulse transmitted to each input conductor 248, 258 and 268 may be either negative or positive depending upon the polarity of the voltage appearing across the lead wires 85*c* and 85*d* of the secondary windings of the transformers of Row 1 and Columns A, B and C, respectively. The primary windings of the transformers of each of the other Rows 2 through 10 similarly have voltage pulses applied thereacross when the diodes of their respective AND gates 172*b* through 180*b* are simultaneously energized by a decoding matrix pulse and a multivibrator pulse which triggers the driver transistors 190*b* through 190*j*. Since the circuits associated with the primary and secondary windings between their respective AND gates and their respective matrix input terminals 248, 258 and 268 are identical to the corresponding circuits of the transformers of Row 1, the various elements of these circuits have been provided with the same reference numerals to which subscripts "*b . . . j*," respectively, have been added, as the reference numerals of the corresponding elements of such circuits of the transformers of Row 1.

In operation, the data storage device or card 21 is inserted through the slot 36 of the cabinet 24 and is held in predetermined position on the top surface of the transformer block by the guide studs 28 and the stop 22. The various apertures 104 of the magnetic plates 100 are then located in predetermined positions relative to the outer ends of the legs of the cores of the transformers. The switch 150 is then closed, and the pulses from the clock 151 are simultaneously transmitted to the binary counter 160 and the multivibrator 182. A pulse P*d*1 is then transmitted from the decoding matrix through the conductor 171 to the diode 171*a* of the AND gate 171*b* and a pulse P*m*1 from the multivibrator is transmitted to the diode 171*c* of AND gate 171*b* during the duration of the pulse P*d*1. The AND gate 171*b* then sends a voltage pulse across the input circuit of the driver transistor 190 and causes a voltage pulse to be applied simultaneously across the primary windings of the three transformers of Row 1. If the plate 100 of the magnetic substances now has an aperture aligned between the outer ends of an outer leg and the middle leg of the cores of each of the transformers of Row 1, the unbalance in the reluctance of the pairs of flux paths of the cores of these transformers causes a voltage pulse of a preselected polarity to appear across the lead wires 85*c* and 85*d* of the secondary windings of each of the transformers which are then transmitted to the input conductors 248, 258 and 268 of the matrix 249. These pulses may be either positive or negative. If the magnetic plate has various apertures aligned between an outer leg and the middle leg of a particular transformer of Row 1, no voltage pulse appears across its secondary windings. The matrix converts the ternary code signals thus transmitted to it to binary code signals and transmits these output signals through its output conductors T to any suitable data handling or data controlled device. During the time the primary windings of the transformers of Row 1 are energized, none of the other AND gates apply any signals to the input circuits of their associated driver transmitters 190*b*, 190*c* . . . 190*j*, since no pulses are applied to their diodes 172*d*, 173*d* . . . 180*c*. The next pulse P*d*2 from the decoding matrix is transmitted through the conductor 172 to the diode 172*a* of the AND gate 172*b* and during its duration the next multivibrator pulse P*m*2 is transmitted through the conductor 183 and 182*a* to the diode 172*d* of the AND gate 172*b*. The AND gate 172*b* therefore causes a pulse to be applied across the input circuit of the driver transistor 190*b* and thus causes a voltage pulse to be applied across the primary windings of the three transformers of Row 2 of the transformer block when the clock transmits the second pulse. The outputs across the terminal wires 85*c* and 85*d* of the secondary windings of these transformers are then transmitted to the input conductors 248, 258 and 268 of the matrix 249 through the resistances 240*b*, 250*b* and 260*b* and, depending upon whether or not apertures in the magnetic plate 100 are aligned with the outer ends of the legs of the cores of these transformers, either a voltage pulse of a preselected polarity or no voltage pulse is transmitted through the input conductors 248, 258 and 268 to the matrix 249 and converted by the matrix 249 to binary code pulses. The third pulse from the clock causes a pulse to be applied across the primary windings of the transformers of Row 3 in the same manner and at each succeeding pulse of the clock a voltage pulse is applied across the primary windings of the transformers of the Rows 4 through 10 until the primary windings of the transformers of all the Rows 1 through 10 have had such interrogation voltage pulses applied thereacross.

It will be apparent that the output of the matrix 249 may be employed to control the operation of any desired apparatus such as gasoline vending or dispensing apparatus at a refinery or storage terminal so that a truck driver may, by inserting his particular card 21 into a data translating device, cause the apparatus to permit opening of certain valves or the operation of certain pumps so that the truck driver may fill his truck with a predetermined blend of gasoline and so that the amount of gasoline dispensed, the identity of the driver and any other desired information may be recorded by a suitable computer and recorder means of such apparatus.

It will also be apparent that the control system of the invention may be employed as an identification means to permit entry of authorized personnel only to certain restricted areas, as a means for controlling or programing the operation of machine tools, and in general to control operation of any desired apparatus.

It will further be seen that while the outputs of the transformers have been shown as transmitted to a matrix 249 which translates the ternary code output into a binary code, which is then fed to the data handling device of an apparatus, the outputs of the transformers can be fed directly to such data handling device if such data handling device is designed to receive and utilize ternary code outputs or signals.

It will further be seen that the primary windings of selected rows or groups of transformers have been shown as energized sequentially by voltage pulses in order to simplify the circuitry, that the primary windings of all transformers could be simultaneously energized in which case the secondary windings of the transformers would have to be individually connected to the data handling device.

It will further be seen that the card 21 may be of very small size since the transformers and the transformer block may be of very small dimensions.

It will also be seen that while the transformers have been described as having cores providing flux paths of equal reluctance and as having primary and secondary windings of equal numbers of turns, the reluctances of the flux paths of each core may be different and the number of turns in the windings may also be different as long as a predetermined relationship between the reluctances of the flux paths is provided which is selectively changed or varied in a predetermined manner by the magnetic plate 100 so that the outputs of the secondary windings may be controlled in a manner predetermined by apertures of, and their location on, the card.

It will further be seen that the reluctance of the flux paths may also be varied by selecting magnetic plates 100 of different thicknesses or of magnetic substances of different reluctances and also by varying the thickness of the plastic sheets between and to which the magnetic plate is bonded so that the card 21 may not be easily duplicated and any counterfeit thereof will not cause proper operation of a suitable monitor circuit which may be made sensitive not only to the location of the apertures 104 of the card but also of the reluctances of the flux paths even if the apertures 104 are in the proper locations.

It will also be apparent that the card 21 may have instead of plate 100 a plurality of spaced pieces of magnetic substance embedded therein to vary the reluctances of preselected flux paths of the transformers of the transformer block 25.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A control system including: a data storage device comprising a planar member, said planar member having discontinuities in the magnetic reluctance thereof at predetermined locations thereof; and a data translating device for detecting said discontinuities at said predetermined locations and producing electric signals which vary in accordance with the locations of said discontinuities, said data translating device including a plurality of inductive means, each of said inductive means defining a pair of magnetic flux paths and having flux inducing means for inducing a flux in said paths and flux pickup means responsive to the flux in said paths for producing said electric signals, said flux inducing means and flux pickup means being disposed on one side only of said planar member, the output of each of said pickup means varying in accordance with the variations of the reluctances of said pair of flux paths, said data storage device providing portions of said flux paths and varying said reluctances of said flux paths in accordance with the location of said discontinuities.

2. A control system including: a data storage device comprising a planar member, said planar member having discontinuities in the magnetic reluctance thereof at predetermined locations thereof; a data translating device for detecting said discontinuities at said predetermined locations and producing electric signals which vary in accordance with the locations of said discontinuities, said data translating device including a plurality of inductive means, each of said inductive means defining a pair of magnetic flux paths, the output of each of said inductive means varying in accordance with the variation of the reluctances of said pair of flux paths, said data storage device providing portions of said flux paths and varying said reluctances of said flux paths in accordance with the location of said discontinuities, means for inducing magnetic flux in said flux paths of said inductive means, and means responsive to the magnetic flux in the flux paths of said inductive means for producing voltage outputs which vary in accordance with the locations of said discontinuities, said flux inducing means and said responsive means being disposed on one side only of said planar member.

3. A control system including: a data storage device comprising a flat card having magnetic means, said magnetic means providing discontinuities in reluctance at predetermined locations of said card in accordance with data stored in said card; and a data translating device including a plurality of transformers, each of said transformers having a core providing two flux paths; first means for inducing magnetic flux simultaneously in said two flux paths, and second means responsive to the flux in said two flux paths for providing a voltage which varies in accordance with the variation in the flux in said two flux paths, said card being positionable in predetermined relationship relative to said transformers and causing the reluctances of preselected flux paths of said transformers to vary in accordance with the locations of said discontinuities on said card, said first means and said second means being disposed on one side only of said data storage device.

4. A control system including: a data storage device comprising a flat card having magnetic means, said magnetic means providing discontinuities in reluctance at predetermined locations of said card in accordance with data stored in said card; a data translating device including a plurality of transformers, each of said transformers having a core providing two flux paths; first means for inducing magnetic flux simultaneously in said two flux paths, and second means responsive to the flux in said two flux paths for providing a voltage which varies in accordance with the variation in the flux in said two flux paths, said card being positionable in predetermined relationship relative to said transformers and causing the reluctances of preselected flux paths of said transformers to vary in accordance with the locations of said discontinuities on said card, and means for energizing said first means of said transformers to induce magnetic flux in said flux paths, said first means and said second means being arranged on one side only of said data storage device.

5. A control system including: a data storage device comprising a flat card having magnetic means, said magnetic means providing discontinuities in reluctance at predetermined locations of said card in accordance with data stored in said card; a data translating device including a plurality of transformers, each of said transformers having a core providing two flux paths; first means for inducing magnetic flux simultaneously in said two flux paths; second means responsive to the flux in said two flux paths for providing a voltage which varies in accordance with the variation in the flux in said two flux paths, said card being positionable in predetermined relationship relative to said transformers and causing the reluctances of preselected flux paths of said transformers to vary in accordance with the locations of said discontinuities on said card; means for energizing said first means of said transformers to induce magnetic flux in said flux paths; and means for energizing said first means of said transformers in predetermined sequence, said first means and said second means being disposed on one side only of said data storage device.

6. In a data translating device for reading out information stored in accordance with a predetermined coded relationship on a data storage member the combination including: a plurality of transformers positioned in accordance with said predetermined coded relationship to one another and each providing a pair of flux paths, at least one of said flux paths including an air gap, each of said transformers having first winding means which when energized induce magnetic flux simultaneously in both flux paths and having second winding means operatively associated with said pair of flux paths for producing an output voltage when the reluctances of said pair of flux paths are of a predetermined relationship, said first winding means and second winding means being disposed on one side only of a plane delineated by said air gaps.

7. A control system including: a translating device comprising a plurality of transformers positioned in predetermined relationship to one another and each providing a pair of flux paths, at least one of said flux paths including an air gap, each of said transformers having first winding means which when energized induces magnetic flux simultaneously in both flux paths; second winding means operatively associated with said pair of flux paths for producing an output voltage when the reluctances of said pair of flux paths are of a predetermined relationship, and a data storage device positionable in predetermined relationship to said data translating device and having magnetic means for bridging air gaps of preselected flux paths of said transformers for changing the relationship of the reluctances of the flux paths of preselected transformers, said first winding means and said second winding means being disposed on one side only of said data storage device.

8. A control system including: a translating device comprising a plurality of transformers positioned in predetermined relationship to one another and each providing a pair of flux paths, at least one of said flux paths including an air gap, each of said transformers having first winding means which when energized induces magnetic flux simultaneously in both flux paths; second winding means operatively associated with said pair of flux paths for producing an output voltage when the reluctances of said pair of flux paths are of a predetermined relationship; and a data storage card comprising a plate of magnetic substance positionable in predetermined relationship relative to said transformers for changing the relationship of the reluctances of the flux paths of preselected transformers, said first winding means and said second winding means being disposed on one side only of said storage card.

9. A control system including: a translating device comprising a plurality of transformers positioned in predetermined relationship to one another and each providing a pair of flux paths, at least one of said flux paths including an air gap, each of said transformers having first winding means which when energized induces magnetic flux simultaneously in both flux paths; second winding means operatively associated with said pair of flux paths for producing an output voltage when the reluctances of said pair of flux paths are of a predetermined relationship; and a data storage card comprising a plate of magnetic substance positionble in predetermined relationship relative to said transformers for changing the relationship of the reluctances of the flux paths of preselected transformers, said plate having apertures at preselected locations aligned with the air gaps of the flux paths of preselected transformers, said first winding means and said second winding means being disposed on one side only of said data storage card.

10. In a data translating device for reading out information stored in accordance with a predetermined coded relationship on a data storage member the combination including: a plurality of transformers positioned in accordance with said predetermined coded relationship to one another, each of said transformers comprising a core having a middle leg and a pair of outer legs disposed on appropriate sides of said middle leg and extending parallel thereto, said core providing two flux paths, one of said flux paths comprising one of said outer legs, said middle leg and an air gap between said one of said outer legs and said middle leg, the other of said flux paths comprising the other of said outer legs, said middle leg and an air gap between said other of said outer legs and said middle leg, primary winding means operatively associated with said two flux paths for inducing magnetic flux simultaneously in said two flux paths, and secondary winding means operatively associated with said two flux paths whose voltage output varies in value and polarity in accordance with the relationship of the reluctances of said two flux paths, said primary winding means and said secondary winding means being disposed on one side only of a plane delineated by said air gaps.

11. In a data translating device for reading out information stored in accordance with a predetermined coded relationship on a data storage member the combination including: a plurality of transformers positioned in accordance with said predetermined coded relationship to one another, each of said transformers comprising a core having a middle leg and a pair of outer legs disposed on appropriate sides of said middle leg and extending parallel thereto, said core providing two flux paths, one of said flux paths comprising one of said outer legs, said middle leg and an air gap between said one of said outer legs and said middle leg, the other of said flux paths comprising the other of said outer legs, said middle leg and an air gap between said other of said outer legs and said middle leg, primary winding means operatively associated with said two flux paths for inducing magnetic flux simultaneously in said two flux paths, and secondary winding means operatively associated with said two flux paths whose voltage output varies in value and polarity in accordance with the relationship of the reluctances of said two flux paths; and means for energizing said primary windings of said transformers with voltage pulses, said primary winding means and said secondary winding means being disposed on one side only of a plane delineated by said air gaps.

References Cited

UNITED STATES PATENTS

| | | | |
|---|---|---|---|
| 2,055,175 | 9/1936 | Franz | 336—178 |
| 2,064,771 | 12/1936 | Vogt | 336—178 |
| 2,379,664 | 7/1945 | Stanko | 336—178 |
| 2,750,536 | 6/1956 | Gomonet | 336—178 |
| 3,210,527 | 10/1965 | Daykin | 235—61.114 |
| 3,230,515 | 1/1966 | Smaller | 340—174 |

BERNARD KONICK, *Primary Examiner.*

S. URYNOWICZ, *Assistant Examiner.*